United States Patent
Matsushita et al.

(10) Patent No.: US 10,963,485 B1
(45) Date of Patent: Mar. 30, 2021

(54) STORAGE SYSTEM AND DATA REPLICATION METHOD IN STORAGE SYSTEM

(71) Applicant: Hitachi, Ltd., Tokyo (JP)

(72) Inventors: Takaki Matsushita, Tokyo (JP); Yusuke Yamaga, Tokyo (JP); Akira Deguchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/025,197

(22) Filed: Sep. 18, 2020

(30) Foreign Application Priority Data

Jul. 31, 2020 (JP) .............................. JP2020-130440

(51) Int. Cl.
*G06F 12/00* (2006.01)
*G06F 16/27* (2019.01)
*G06F 3/06* (2006.01)

(52) U.S. Cl.
CPC .............. *G06F 16/27* (2019.01); *G06F 3/065* (2013.01); *G06F 3/0647* (2013.01)

(58) Field of Classification Search
None
See application file for complete search history.

(56) References Cited

U.S. PATENT DOCUMENTS

| 9,646,039 B2 | 5/2017 | Colgrove et al. |
| 2016/0070652 A1* | 3/2016 | Sundararaman ........ G06F 3/065 |
| | | 711/154 |
| 2020/0241969 A1* | 7/2020 | Shveidel ............. G06F 11/1451 |

* cited by examiner

*Primary Examiner* — Jason W Blust
(74) *Attorney, Agent, or Firm* — Mattingly & Malur, PC

(57) ABSTRACT

The operational performance and the I/O performance of Snapshots in a storage system are balanced. In a storage system, meta information of data appended to a log structured area is composed of meta information of a first tier and meta information of a second tier which correlate location information of data in a logical volume and location information of data in the log structured area. When creating a snapshot of the logical volume, a data management unit creates, in the same meta information area as a replication source, a replication of the meta information of the first tier stored in a plurality of meta information areas assigned to a plurality of controllers. A data control unit accesses the data of the log structured area from the logical volume, and accesses the data of the log structured area from the snapshot.

8 Claims, 21 Drawing Sheets

FIG. 4  DIRECTORY TABLE

| PVOL/Snapshot INTERNAL ADDRESS | REFERENCE DESTINATION ADDRESS (MAPPING AREA INTERNAL ADDRESS) |
|---|---|
| 0 | 100 |
| 20 | 300 |
| 40 | 400 |
| ... | ... |
| 1000000 | 500 |

FIG. 5  MAPPING TABLE

| MAPPING AREA INTERNAL ADDRESS | REFERENCE DESTINATION ADDRESS (LOG STRUCTURED AREA INTERNAL ADDRESS) | POST-COMPRESSION CAPACITY |
|---|---|---|
| 100 | 1000 | 8 |
|  | 1010 | 2 |
|  | ... | ... |
| 200 | 4000 | 5 |
|  | ... | ... |
| 300 | 2000 | 10 |
|  | ... | ... |
| ... | ... | ... |

FIG. 6

VOLUME MANAGEMENT TABLE 311

| VOL# | ATTRIBUTE | DIRECTORY# | MAPPING# | CAPACITY | Pool# |
|---|---|---|---|---|---|
| 0 | PVOL | 0,10,200 | 2,5,10 | 100GB | 0 |
| 1 | Snapshot | 1,5,20 | 2,5,10 | 100GB | 0 |
| 2 | DSVOL | — | — | 1TB | 0 |
| ... | ... | ... | ... | ... | ... |

DIRECTORY AREA MANAGEMENT TABLE

| DIRECTORY# | DIRECTORY AREA OFFSET ADDRESS |
|---|---|
| 0 | 50 |
| 1 | 300 |
| 2 | 20 |
| 3 | 100 |
| ... | ... |

FIG. 8

MAPPING AREA MANAGEMENT TABLE

| MAPPING# | MAPPING AREA OFFSET ADDRESS |
|---|---|
| 0 | 400 |
| 1 | 1000 |
| 2 | 2000 |
| 3 | 10000 |
| ... | ... |

FIG. 9

DIRECTORY AREA ASSIGNMENT TABLE

| DIRECTORY AREA OFFSET ADDRESS | ASSIGNED DIRECTORY# |
|---|---|
| 0 | 1 |
| 10 | 3 |
| 20 | - (NOT YET ASSIGNED) |
| ... | ... |

FIG. 10

MAPPING AREA ASSIGNMENT TABLE

| MAPPING AREA OFFSET ADDRESS | ASSIGNED MAPPING# |
|---|---|
| 0 | 2 |
| 100 | - (NOT YET ASSIGNED) |
| 200 | 5 |
| ... | ... |

FIG. 11

Snapshot GENERATION MANAGEMENT TABLE 316

| PVOL# | LATEST GENERATION# | GENERATION# | Snapshot CREATION TIME | Snapshot# | STATUS |
|---|---|---|---|---|---|
| 0 | 1 | 0 | T0 | 100 | PAIR |
|  |  | 1 | T1 | 200 | SUSPEND |
|  |  | ... | ... | ... | ... |
|  |  | 1023 | T1023 | 10 | PAIR |
| 1 | 0 | 0 | T2 | 20 | SUSPEND |
|  |  | ... | ... | ... | ... |
| ... |  |  |  |  |  |

BACK-END WRITE PROCESSING

FIG. 19 RESYNC PROCESSING (FIRST EMBODIMENT)

DIAGRAM FOR EXPLAINING EFFECT OF
FIRST EMBODIMENT (PART 1)

DIAGRAM FOR EXPLAINING EFFECT OF FIRST EMBODIMENT (PART 2)

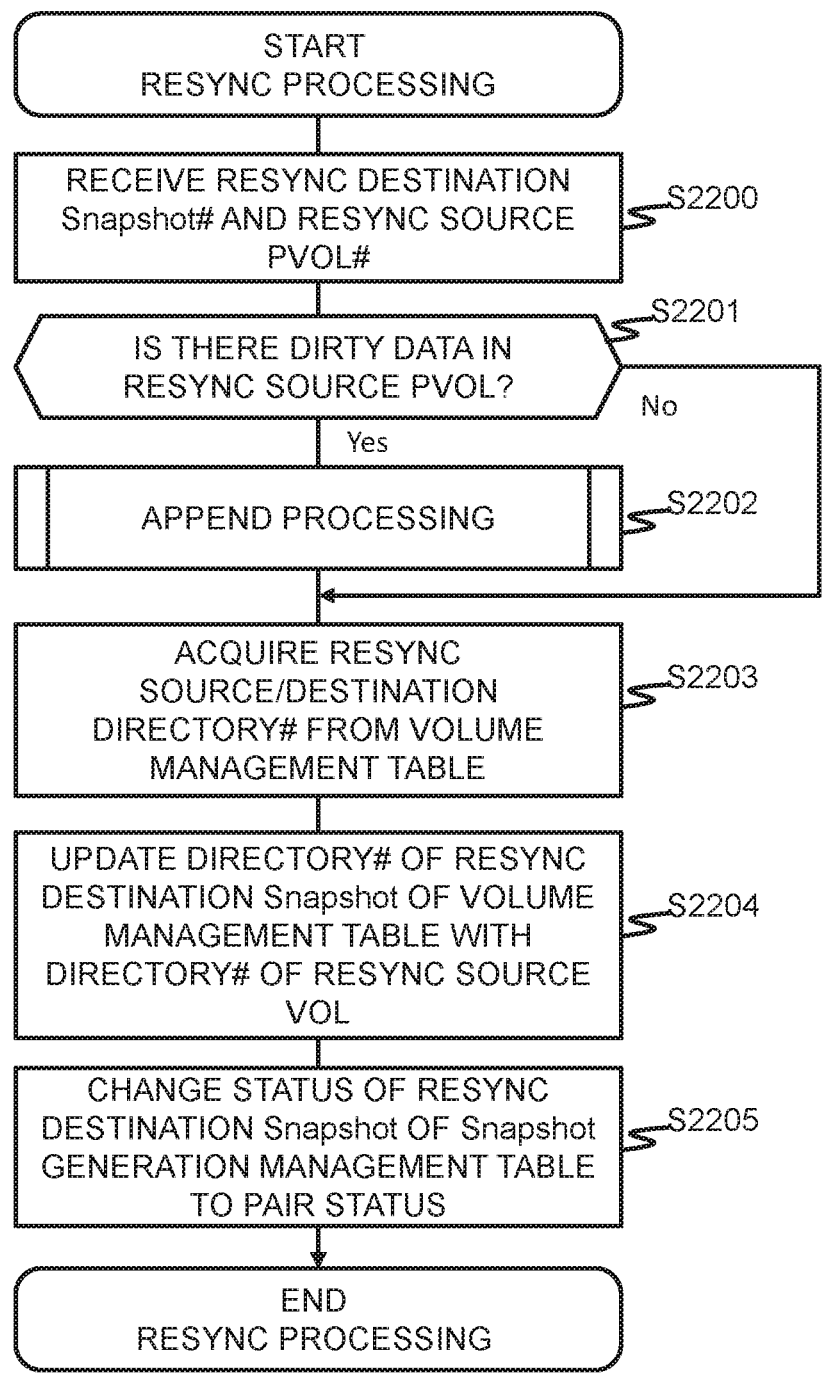

STORAGE SYSTEM AND DATA REPLICATION METHOD IN STORAGE SYSTEM

CROSS-REFERENCE TO RELATED APPLICATION

The present application claims priority from Japanese application JP 2020-130440, filed on Jul. 31, 2020, the contents of which is hereby incorporated by reference into this application.

TECHNICAL FIELD

The present invention relates to a storage system and a data replication method in a storage system.

BACKGROUND ART

In recent years, data utilization needs are increasing, and occasions of data replication have increased. In line with this, the Snapshot function is becoming even more important in storage systems. Conventionally, as a representative means for realizing the Snapshot function, there is the Redirect on Write (RoW) method (for example, refer to PTL 1). With the RoW method, since there is no copying of data or meta information, there is an advantage in that the influence on the I/O performance during the creation of a Snapshot is small. The RoW method is often adopted in AFA (All Flash Array) devices.

The RoW method is a method of appending and writing data. The expression "appending and writing" refers to, when writing data in a storage system, a data storage method of storing write data in a new area without overwriting the data that had been stored before the writing process, and rewriting meta information so as to refer to the data stored in the new area. Meta information is managed based on a tree structure. When a Snapshot of a certain replication source volume is acquired, the Root of the meta information tree of the replication source volume at such point in time is referenced from the Root of the meta information tree of the Snapshot. At this point in time, since the Root of the replication source volume has been referenced from the Snapshot, rewriting is disabled, and only reading is enabled. Moreover, a new Root is prepared in the replication source pursuant to the writing of data in the replication source volume, and new meta information for referring to the storage location of the update data is created and connected under the control of the new Root. Furthermore, the old Root is referenced from the new Root so that the data storage location of a not-yet-written area can be identified. In other words, the meta information cannot be directly rewritten pursuant to the acquisition of the Snapshot, and the meta information is also appended and written.

CITATION LIST

Patent Literature

[PTL 1] Specification of U.S. Pat. No. 9,646,039

SUMMARY OF THE INVENTION

Problems to be Solved by the Invention

Nevertheless, with the RoW method of conventional technologies, it is necessary to search for the intended data and meta information from the meta information tree during the reading of data, and there is a problem in that the read performance (in particular, the response) is inferior. Moreover, the tree tier becomes deep as the writing of data increases, and there is a problem in that asynchronous processing is activated for reducing the number of tree stages, and the I/O performance is thereby affected.

Moreover, meta information other than the Root of the tree is shared with a plurality of volumes and the Snapshot. Nevertheless, meta information of the Root is information for each volume and Snapshot. Thus, when the load is concentrated on a specific volume or Snapshot, the load will be concentrated on a specific controller among a plurality of controllers which respectively control each volume and each Snapshot, and there is a problem in that the resources of a multi controller cannot be exhausted.

The present invention was devised in view of the foregoing problems, and an object of this invention is to balance the operational performance and the I/O performance of Snapshots in a storage system.

Means to Solve the Problems

In order to achieve the foregoing object, the present invention provides a storage system including a plurality of controllers and capable of creating a snapshot, which is a replication of a logical volume, wherein: the logical volume or the snapshot to be handled by the controller is assigned to the controller; a log structured area which stores data of the logical volume or the snapshot, and a meta information area which stores meta information of the data appended to the log structured area, are assigned to the controller; the controller comprises a data control unit which appends the data of the logical volume to the log structured area, and a data management unit which stores the meta information of the data appended to the log structured area by the data control unit in the meta information area; the meta information is composed of meta information of a first tier and meta information of a second tier which correlate location information of the data in the logical volume and location information of the data in the log structured area, wherewith the meta information of the first tier is information which correlates the location information of the data in the logical volume and a storage location of the meta information of the second tier related to that data, and the meta information of the second tier is information which manages the location information of the data in the log structured area; when creating a snapshot of the logical volume, the data management unit creates, in the same meta information area as a replication source, a replication of the meta information of the first tier stored in a plurality of meta information areas assigned to a plurality of controllers; and the data control unit of the controller pertaining to the meta information area in which the replication of the meta information of the first tier was created accesses the data of the appended area from the logical volume based on the meta information of the second tier referenced based on the meta information of the first tier, and accesses the data of the log structured area from the snapshot based on the meta information of the second tier referenced based on the replication of the meta information of the first tier.

Advantageous Effects of the Invention

According to the present invention, it is possible to balance the operational performance and the I/O performance of Snapshots in a storage system.

BRIEF DESCRIPTION OF DRAWINGS

FIG. 4 is an explanatory diagram of the configuration of the directory table.

FIG. 5 is an explanatory diagram of the configuration of the mapping table.

FIG. 6 is an explanatory diagram of the configuration of the volume management table.

FIG. 7 is an explanatory diagram of the configuration of the directory area management table.

FIG. 8 is an explanatory diagram of the configuration of the mapping area management table.

FIG. 9 is an explanatory diagram of the configuration of the directory area assignment table.

FIG. 10 is an explanatory diagram of the configuration of the mapping area assignment table.

FIG. 11 is an explanatory diagram of the configuration of the Snapshot generation management table.

FIG. 24 is a flowchart showing the processing routine of the resync processing of the second embodiment.

DESCRIPTION OF EMBODIMENTS

Figure 1:
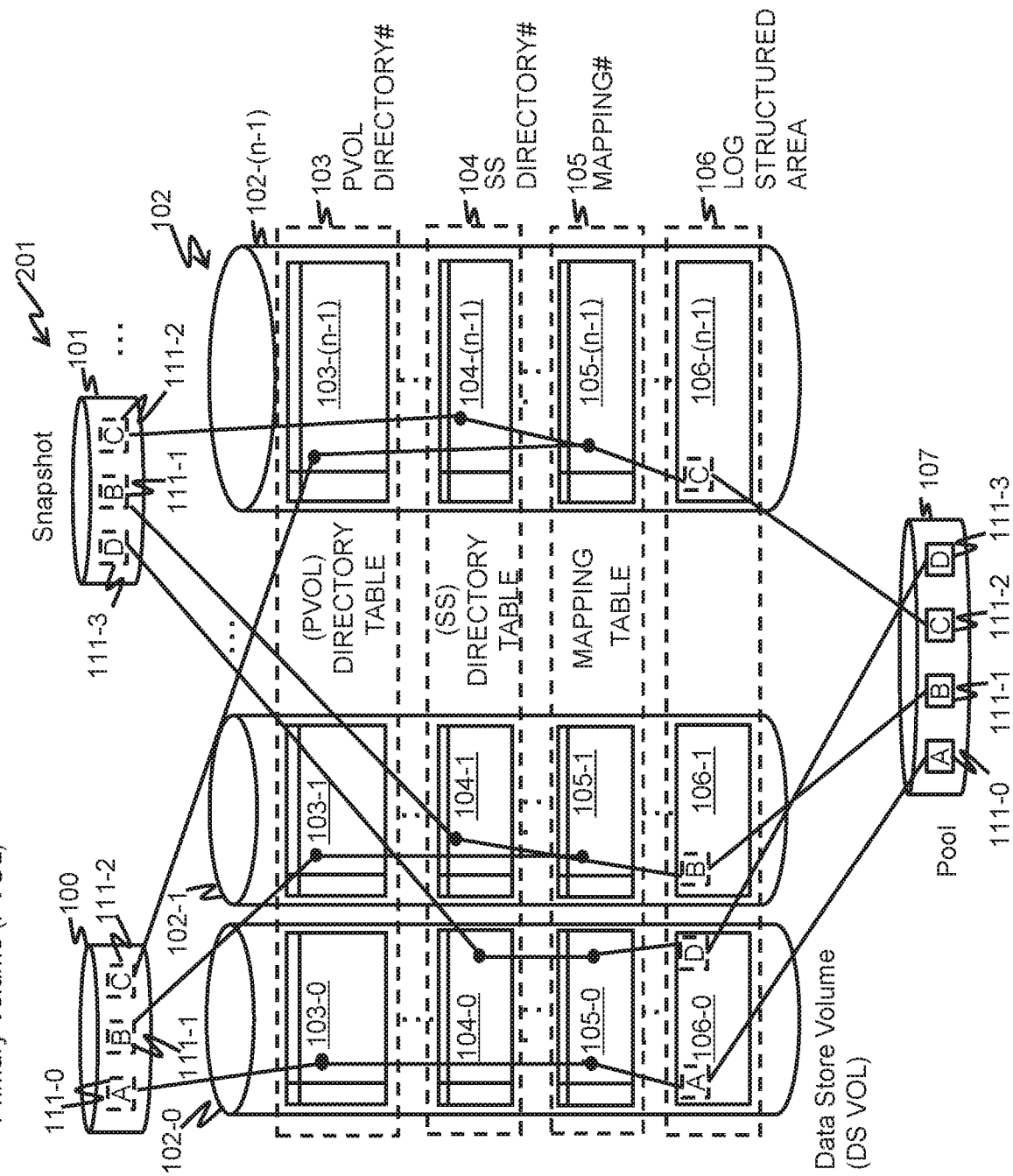
FIG. 1 is an explanatory diagram of the overview of the logical configuration of the storage system according to an embodiment.

An embodiment of the present invention is now explained with reference to the appended drawings. Note that the embodiments explained below do not limit the claimed invention, and not all of the various elements and their combinations explained in the embodiments are necessarily essential as the solution of the present invention. Moreover, illustrations and explanations of configurations of the present invention which are essential, but known, may be omitted as appropriate.

In the following explanation, information in which an output is obtained in response to an input may be explained by using an expression such as "xxx table", but such information may be data of any structure. Accordingly, "xxx table" may also be referred to as "xxx information".

Moreover, in the following explanation, the configuration of each table is merely an example, and one table may be divided into two or more tables, or all or a part of the two or more tables may be one table.

Moreover, in the following explanation, the processing may be explained using the term "program" as the subject. Because a program performs predetermined processing while suitably using a storage unit and/or an interface unit as a result of being executed by the processor unit, the subject of processing may also be a processor unit (or a device such as a controller which is equipped with a processor unit).

A program may be installed in a device such as a computer or exist, for example, in a program distribution server or a computer-readable (for example, non-temporary) recording medium. Moreover, in the following explanation, two or more programs may be realized as one program, or one program may be realized as two or more programs.

Moreover, a "processor unit" is one or more processors. While a processor is typically a microprocessor such as a CPU (Central Processing Unit), it may also be a different type of processor such as a GPU (Graphics Processing Unit). Moreover, a processor may be a single-core processor or a multi-core processor. Moreover, a processor may be a processor in a broad sense such as a hardware circuit (for example, FPGA (Field-Programmable Gate Array) or an ASIC (Application Specific Integrated Circuit)) which performs a part or all of the processing.

Moreover, in the following explanation, while identification numbers are used as the identification information of various targets, identification information (for example, identifier including an alphabetical character or a reference numeral) of a type other than the identification number may also be adopted. In the following explanation, "#" represents a number, and, for example, "xxx #" represents xxx which is identified with a number.

Moreover, in the following explanation, when similar elements are explained without differentiation, a reference code (or a common code among reference codes) may be used, and when similar elements are explained by being differentiated, an identification (or reference code) of the element may be used. Moreover, the number of the respective elements illustrated in each diagram is not limited to the examples depicted in the diagrams.

First Embodiment

FIG. 1 is an explanatory diagram of the overview of the logical configuration of the storage system 201 according to an embodiment. The storage system 201 is a storage system that uses the RoW (Redirect on Write) method when creating a Snapshot. As shown in FIG. 1, the storage system 201 includes, as its logical configuration, a PVOL (Primary Volume) 100, a Snapshot 101, a DSVOL (Data Store Volume) 102, and a Pool 107.

The PVOL 100 is a logical volume that is provided to a host device. The Snapshot 101 is a replication volume of the PVOL 100 created based on the RoW method, and is provided to a host device.

A physical storage area is assigned to the Pool 107 from a physical drive (not shown). The DSVOL 102 is a logical storage area that is selected and extracted from the Pool 107, and is a logical storage area that includes a plurality of DSVOLs 102-*i* (i=0, 1, ..., n−1 (n is a fixed number of DSVOLs for each Pool 107)). All DSVOLs 102-*i* are of the same capacity.

In the DSVOL 102, a PVOL directory table 103 storing the management information (meta information) of the PVOL 100 is distributed and arranged as a directory table 103-*i* (i=0, 1, ..., n−1) in each DSVOL 102-*i*. The management information of the PVOL 100 is mapping information of a 2-stage tier tree configuration, and the PVOL directory table 103 corresponds to the mapping information of the first tier.

The PVOL directory table 103 is a group of the directory tables 103-*i* (i=0, 1, ..., n−1), and is provided for each PVOL 100. A directory # is assigned to the directory table 103. A plurality of directory tables 103 may be assigned to one PVOL depending on the capacity of the PVOL. In the foregoing case, a directory # is also assigned in a plurality.

The PVOL directory table 103 is a table which converts a PVOL internal address of data 111-*j* (j=0, 1, 2) in the PVOL 100 into an internal address of the DSVOL 102 to store a mapping table 105.

Moreover, in the DSVOL 102, an SS (SnapShot) directory table 104 storing the management information (meta information) of the Snapshot 101 is distributed and assigned as a directory table 104-*i* (i=0, 1, ..., n−1) in each DSVOL 102-*i*. The directory table 104-*i* of the SS directory table 104 is a copy of the directory table 103-*i* of the PVOL directory table 103.

The SS directory table 104 is a group of the directory tables 104-*i* (i=0, 1, ..., n−1), and is provided for each Snapshot 101. A directory # is assigned to the directory table 104. A plurality of directory tables 104 may be assigned to one Snapshot depending on the capacity of the Snapshot. In the foregoing case, a directory # is also assigned in a plurality. The SS directory table 104 has the same table configuration as the PVOL directory table 103.

The SS directory table 104 is a table which converts a Snapshot internal address of data 111-*j* (j=1, 2, 3) in the Snapshot 101 into an internal address of the DSVOL 102 to store the mapping table 105.

Moreover, in the DSVOL 102, the mapping table 105 storing the management information (meta information) of the PVOL 100 and the Snapshot 101 is distributed and arranged as a mapping table 105-*i* (i=0, 1, ..., n−1) in each DSVOL 102-*i*. The mapping table 105 corresponds to the mapping information of a second tier of the foregoing mapping information of the 2-stage tier tree configuration.

The mapping table 105 is a group of the mapping tables 105-*i* (i=0, 1, ..., n−1), and is provided for each PVOL 100. The plurality of mapping tables 105 are differentiated with a number such as a mapping #. A mapping # is assigned for each Snapshot tree (Snapshot group having a certain PVOL as its Root), and increased according to the increase in the data capacity based on the writing of data in the PVOL or the Snapshot.

The mapping table 105 is a table which converts a PVOL/Snapshot internal address of data 111-*j* (j=0, 1, 2, 3) into an internal address of a log structured area 106.

Moreover, in the DSVOL 102, the log structured area 106 storing the data of the PVOL 100 and the Snapshot 101 is distributed and arranged as a log structured area 106-*i* (i=0, 1, ..., n−1) in each DSVOL 102-*i*.

As described above, one or more (PVOL) directory tables 103-*i*, one or more (SS) directory tables 104-*i*, one or more mapping tables 105-*i*, and a log structured area 106-*i* are arranged in each DSVOL 102-*i*.

Figure 2:
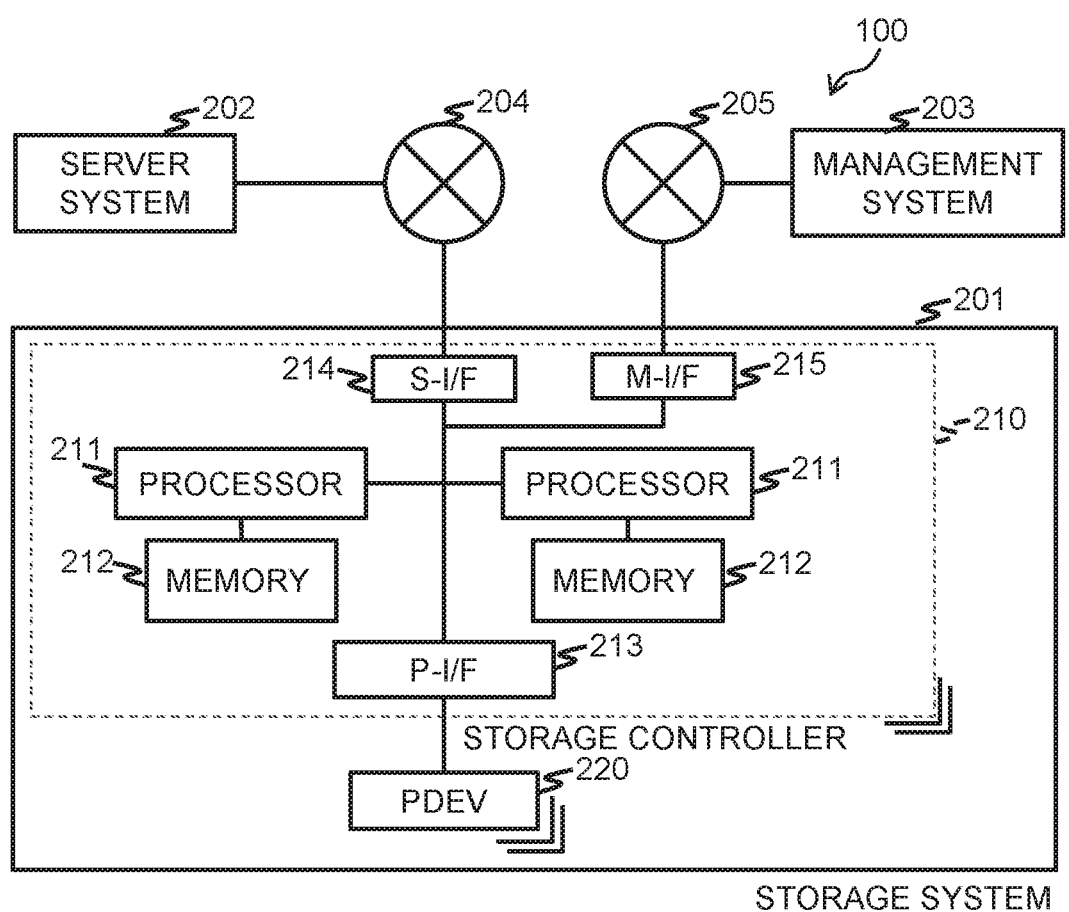
FIG. 2 is an explanatory diagram of the hardware configuration of the computer system according to the first embodiment.

FIG. 2 is an explanatory diagram of the hardware configuration of the computer system 100 according to the first embodiment. The computer system 100 comprises a storage system 201, a server system 202, and a management system 203. The storage system 201 and the server system 202 are connected via an FC (Fiber Channel) network 204. The storage system 201 and the management system 203 are connected via an IP (Internet Protocol) network 205. Note that the FC network 204 and the IP network 205 may be the same communication network.

The storage system 201 comprises a plurality of storage controllers 210, and a plurality of PDEVs 220. A PDEV 220, which is a physical device, is connected to the storage controller 210. One or more DSVOLs 102-*i* (i=0, 1, ..., n−1) are assigned to one storage controller 210.

The storage controller 210 comprises one or more processors 211, one or more memories 212, a P-I/F 213, an S-I/F 214, and an M-I/F 215.

The processor 211 is an example of a processor unit. The processor 211 may also include a hardware circuit which performs compression and decompression. In this embodiment, the processor 211 performs control related to Snapshot creation, restoration, resync, compression, and decompression.

The memory 212 is an example of a storage unit. The memory 212 stores programs to be executed by the processor 211, and data to be used by the processor 211. The processor 211 executes the programs stored in the memory 212. Note that, in this embodiment, for example, the memory is made redundant based on a pair of the memory 212 and the processor 211.

The P-I/F 213, the S-I/F 214 and the M-I/F 215 are examples of an interface unit.

The P-I/F 213 is a communication interface device which intermediates the exchange of data between the PDEV 220 and the storage controller 210. A plurality of PDEVs 220 are connected to the P-I/F 213.

The S-I/F 214 is a communication interface device which intermediates the exchange of data between the server system 202 and the storage controller 210. The server system 202 is connected to the S-I/F 214 via the FC network 204.

The M-I/F 215 is a communication interface device which intermediates the exchange of data between the management system 203 and the storage controller 210. The management system 203 is connected to the M-I/F 215 via the IP network 205.

The server system 202 is configured by including one or more host devices. The server system 202 sends an I/O request (write request or read request), which designates an I/O destination, to the storage controller 210. The I/O destination is, for example, a logical volume number such as a LUN (Logical Unit Number), or a logical address such as an LBA (Logical Block Address).

The management system 203 is configured by including one or more management devices. The management system 203 manages the storage system 201.

Figure 3:
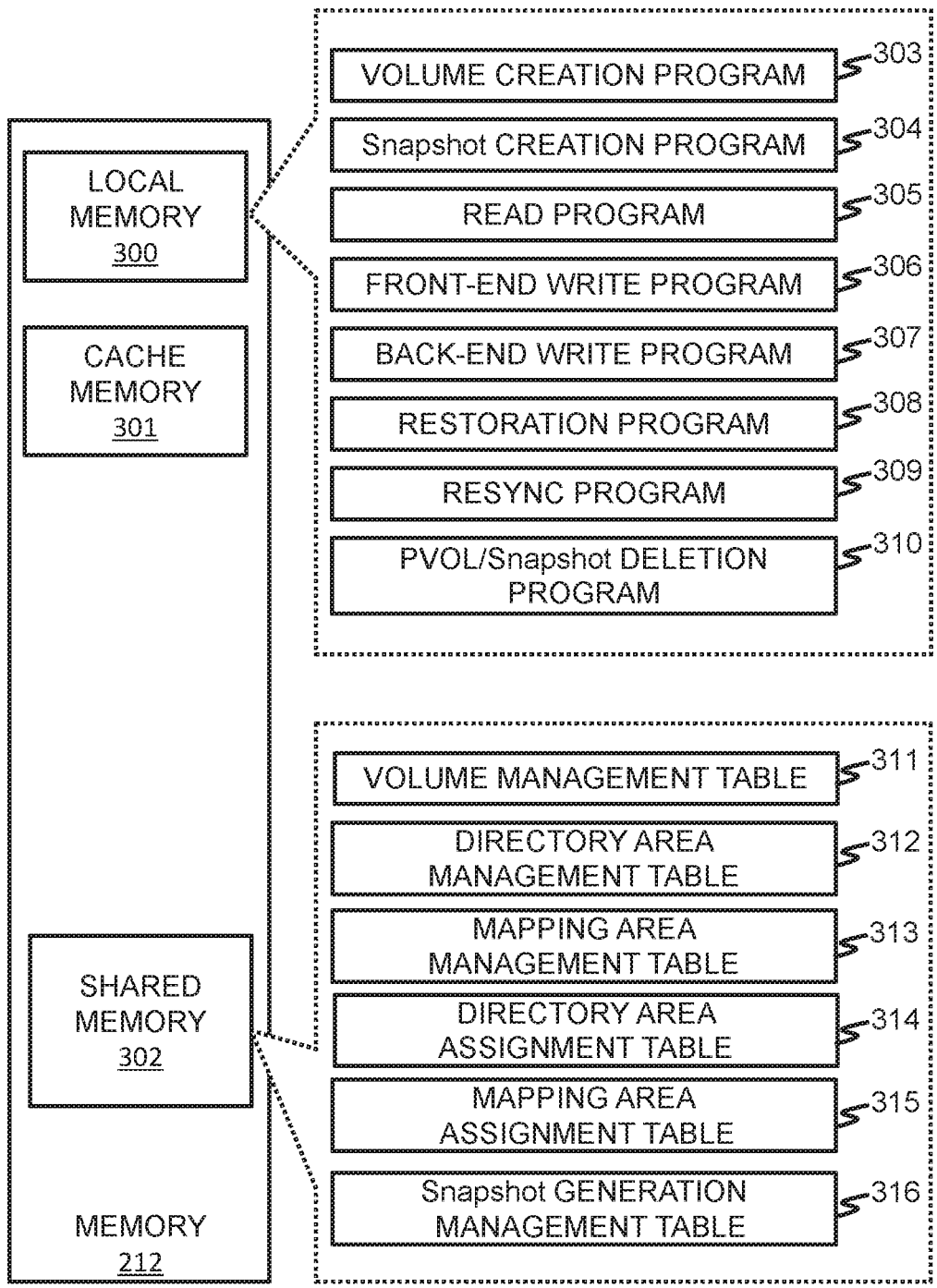
FIG. 3 is an explanatory diagram of the programs and information used by the storage system.

FIG. 3 is an explanatory diagram of the programs and information used by the storage system 201. The memory 212 includes memory areas of a local memory 300, a cache memory 301, and a shared memory 302. At least one among these memory areas may be an independent memory. The local memory 300 is used by the processor 211 belonging to the same pair as the memory 212 including the local memory 300.

The local memory 300 stores a volume creation program 303, a Snapshot creation program 304, a read program 305, a front-end write program 306, a back-end write program 307, a restoration program 308, a resync program 309, and a PVOL/Snapshot deletion program 310. These programs are provided for each of the plurality of storage controllers 210, and perform the intended processing by coordinating with each other. These programs will be explained later.

The cache memory 301 temporarily stores a data set to be written in or read from the PDEV 220.

The shared memory 302 is used by both the processor 211 belonging to the same pair as the memory 212 including the shared memory 302, and the processor 211 belonging to a different pair. The management information is stored in the shared memory 302.

The management information includes a volume management table 311, a directory area management table 312, a mapping area management table 313, a directory area assignment table 314, a mapping area assignment table 315, and a Snapshot generation management table 316. These tables will be explained later with reference to the appended drawings.

FIG. 4 is an explanatory diagram of the configuration of the directory table 103-$i$, 104-$i$ ($i$=0, 1, ..., n−1). The PVOL directory table 103-$i$ and the SS directory table 104-$i$ are of the same configuration and of the same data size, and are respectively distributed and arranged in the DSVOL 102-$i$. One entry of each directory table 103-$i$, 104-$i$ corresponds to data in units of granularity (for instance, 256 KB) of the logical data of the PVOL 100. In other words, the directory tables 103, 104 are distributed and arranged in a plurality of DSVOLs 102-$i$ in units of granularity of the logical data of the PVOL 100. The directory table 104-$i$ ($i$=0, 1, ..., n−1) is a table to which the directory table 103-$i$ ($i$=0, 1, ..., n−1) has been copied based on the control of the storage controller 210 of the DSVOL 102-$i$.

The directory table 103-$i$, 104-$i$ includes a PVOL/Snapshot internal address 400 and a reference destination address (mapping area internal address) 401. The PVOL/Snapshot internal address 400 is a storage logical address of the target data in the PVOL 100 in the case of the directory table 103-$i$, and is a storage logical address of the target data in the Snapshot 101 in the case of the directory table 104-$i$. The reference destination address (mapping area internal address) 401 is pointer information to the mapping table 105-$i$. The PVOL/Snapshot internal address 400 has an upper limit (1000000 in the example of FIG. 4), and a directory table of a new group (directory #) is created upon exceeding the upper limit.

Moreover, whether the table storing the correspondence relationship of the accessed PVOL/Snapshot internal address 400 and reference destination address (mapping area internal address) 401 is either the directory table 103-$i$ or the directory table 104-$i$ of the corresponding directory # is determined based on the remainder after dividing the PVOL/Snapshot internal address 400 by the number-n of DSVOLs.

The reference destination address (mapping area internal address) 401 corresponds to the mapping area internal address 500 of the mapping table 105-$i$ associated with the directory table 103-$i$, 104-$i$.

FIG. 5 is an explanatory diagram of the configuration of the mapping table mapping table 105-$i$ ($i$=0, 1, ..., n−1). The mapping table 105-$i$ includes a mapping area internal address 500, a reference destination address (log structured area internal address) 501, and a post-compression capacity 502.

The mapping area internal address 500 is the reference destination address (mapping area internal address) 401 of the directory table 103-$i$, 104-$i$ associated with the mapping table 105-$i$. The reference destination address (log structured area internal address) 501 is the internal address of the log structured area 106 storing the target data. The post-compression capacity 502 is the data volume after compression when the target data of the PVOL 100 or the Snapshot 101 is stored in the log structured area 106-$i$.

FIG. 6 is an explanatory diagram of the configuration of the volume management table 311. The volume management table 311 is a table for managing volumes such as the PVOL 100, the Snapshot 101, and the DSVOL 102. The volume management table 311 includes a VOL #600, an attribute 601, a directory #602, a mapping #603, a capacity 604, and a Pool #605.

The VOL #600 is a number which identifies the volume. The attribute 601 is a classification of the volume identified based on the VOL #600, and is a PVOL, a Snapshot, a DSVOL or the like. The directory # is a number of the group of the directory table assigned to the volume identified based on the VOL #600.

As the directory #, a plurality of areas in the DSVOL 102 are assigned according to the capacity of the volume. For example, in FIG. 6, a group of the PVOL directory tables having a directory # of 0, 10, and 200 is assigned to a PVOL having a VOL # of 0. Moreover, a group of the Snapshot directory tables having a directory # of 1, 5, and 20 is assigned to a Snapshot having a VOL # of 1. The directory #602 of the DSVOL 102 is NULL.

The mapping #603 is a number of the group of the mapping tables assigned to the volume identified based on the VOL #600. The mapping # of the Snapshot 101 that copied the PVOL 100 is common with the replication source PVOL. For example, in FIG. 6, a group of the mapping tables having a mapping # of 2, 5, and 10 is assigned to each volume having a VOL # of 0 or 1. The mapping #603 of the DSVOL 102 is NULL.

The capacity 604 is the capacity of the volume identified based on the VOL #600. The Pool #605 is the number of the Pool from which the volume identified based on the VOL #600 is selected and extracted.

FIG. 7 is an explanatory diagram of the configuration of the directory area management table 312. The directory area management table 312 is a table for managing the offset address of each directory # in the DSVOL 102. The directory area management table 312 includes a directory #700 and a directory area offset address 701. For example, an area in which the address 50 in the same DSVOL 102 is the offset address has been allocated in a directory having a directory # of 0.

A serial number of the directory # in the corresponding VOL/Snapshot can be obtained from the quotient obtained by dividing the PVOL/Snapshot internal address of the target data by the capacity that can be managed by one directory table. The directory #700 can be obtained from the serial number of the directory # by referring to the directory #602 of FIG. 6.

FIG. 8 is an explanatory diagram of the configuration of the mapping area management table 313. The mapping area management table 313 is a table for managing the offset address of each mapping # in the DSVOL 102. The mapping area management table 313 includes a mapping #800 and a mapping area offset address 801.

FIG. 9 is an explanatory diagram of the configuration of the directory area assignment table 314. The directory area assignment table 314 is a table for managing each directory # assigned to the directory area offset address 900 in the DSVOL 102, and is a reverse lookup table of the directory area management table 312. The directory area assignment table 314 includes a directory area offset address 900 and an assigned directory #901.

FIG. 10 is an explanatory diagram of the configuration of the mapping area assignment table 315. The mapping area assignment table 315 is a table for managing each mapping # assigned to the mapping area offset address 1000 in the DSVOL 102, and is a reverse lookup table of the mapping area management table 313. The mapping area assignment table 315 includes a mapping area offset address 1000 and an assigned mapping #1001.

FIG. 11 is an explanatory diagram of the configuration of the Snapshot generation management table 316. In the Snapshot generation management table 316, the latest generation of the Snapshot is managed for each PVOL # of the PVOL 100, which is a replication source. The Snapshot generation management table 316 includes a PVOL #1100, a latest generation #1101, a generation #1102, a Snapshot creation time 1103, a Snapshot #1104, and a status 1105. The Snapshot generation management table 316 manages, for example, 1024 generations for each PVOL # (generation #=0 to 1023).

In the Snapshot generation management table 316, the latest generation # is incremented for each Snapshot creation of each PVOL #, and the Snapshot creation time 1103, the Snapshot #1104, and the status 1105 corresponding to the latest generation #1101 are updated. The status 1105 includes "PAIR" which synchronizes the data of the PVOL and the Snapshot, while disabling the I/O to and from the Snapshot, after the Snapshot creation of the PVOL. Moreover, the status 1105 includes "SUSPEND (divide)" which disables the synchronization of the data of the PVOL and the Snapshot.

Figure 12:
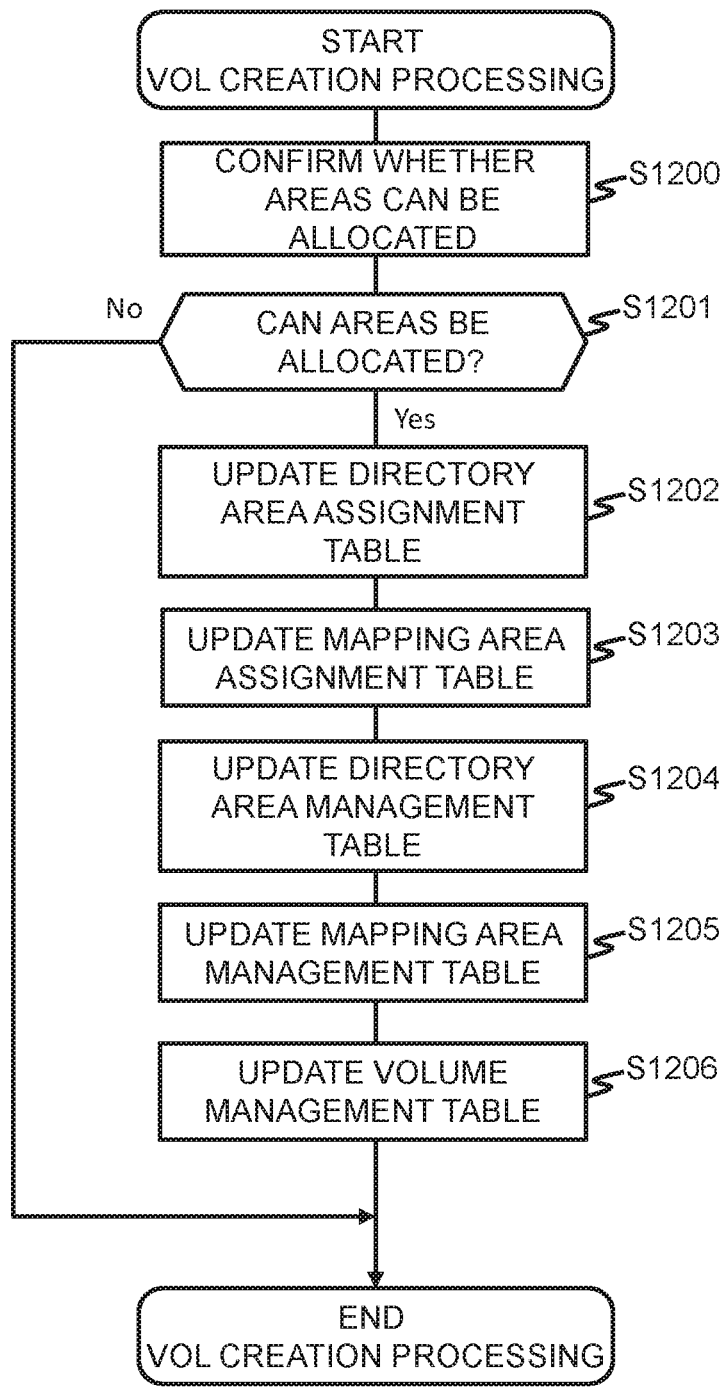
FIG. 12 is a flowchart showing the processing routine of the VOL creation processing.

FIG. 12 is a flowchart showing the processing routine of the VOL creation processing. The VOL creation processing is executed by the volume creation program 303 according to an instruction from the management system 203.

Foremost, in S1200, the volume creation program 303 confirms whether the directory area and the mapping area of the PVOL which satisfy the designated condition (volume capacity or the like) can be allocated in each DSVOL 102-*i* based on all storage controllers 201 which control each DSVOL 102-*i*. The volume creation program 303 proceeds to the processing of S1202 when it is determined that the foregoing areas can be allocated in S1200 (S1201: Yes), and ends the VOL creation processing when it is determined that the foregoing areas cannot be allocated in S1200 (S1201: No).

In S1202, the volume creation program 303 determines the offset address and the assigned directory # of the directory area assigned to the PVOL, which was determined to be assignable in S1201. The volume creation program 303 updates the directory area assignment table 314 by appending the determined offset address and assigned directory # of the directory area.

Next, in S1203, the volume creation program 303 determines the offset address and the assigned mapping # of the mapping area assigned to the PVOL, which was determined to be assignable in S1201. The volume creation program 303 updates the mapping area assignment table 315 by appending the determined offset address and assigned mapping # of the mapping area.

Next, in S1204, the volume creation program 303 updates the directory area management table 312 with the value of the directory area offset address 900 of the directory area assignment table 314 updated in S1202 as the value of the directory area offset address 701, and with the value of the assigned directory #901 as the value of the directory #700.

Next, in S1205, the volume creation program 303 updates the mapping area management table 313 with the value of the mapping area offset address 1000 of the mapping area assignment table 315 updated in S1203 as the value of the mapping area offset address 801, and with the value of the assigned mapping #1001 as the value of the mapping #800.

Next, in S1205, the volume creation program 303 appends, to the volume management table 311, the volume information including the attributes created in the VOL creation processing; that is, the PVOL directory #, mapping #, capacity, and Pool #, and updates the volume management table 311.

Figure 13:
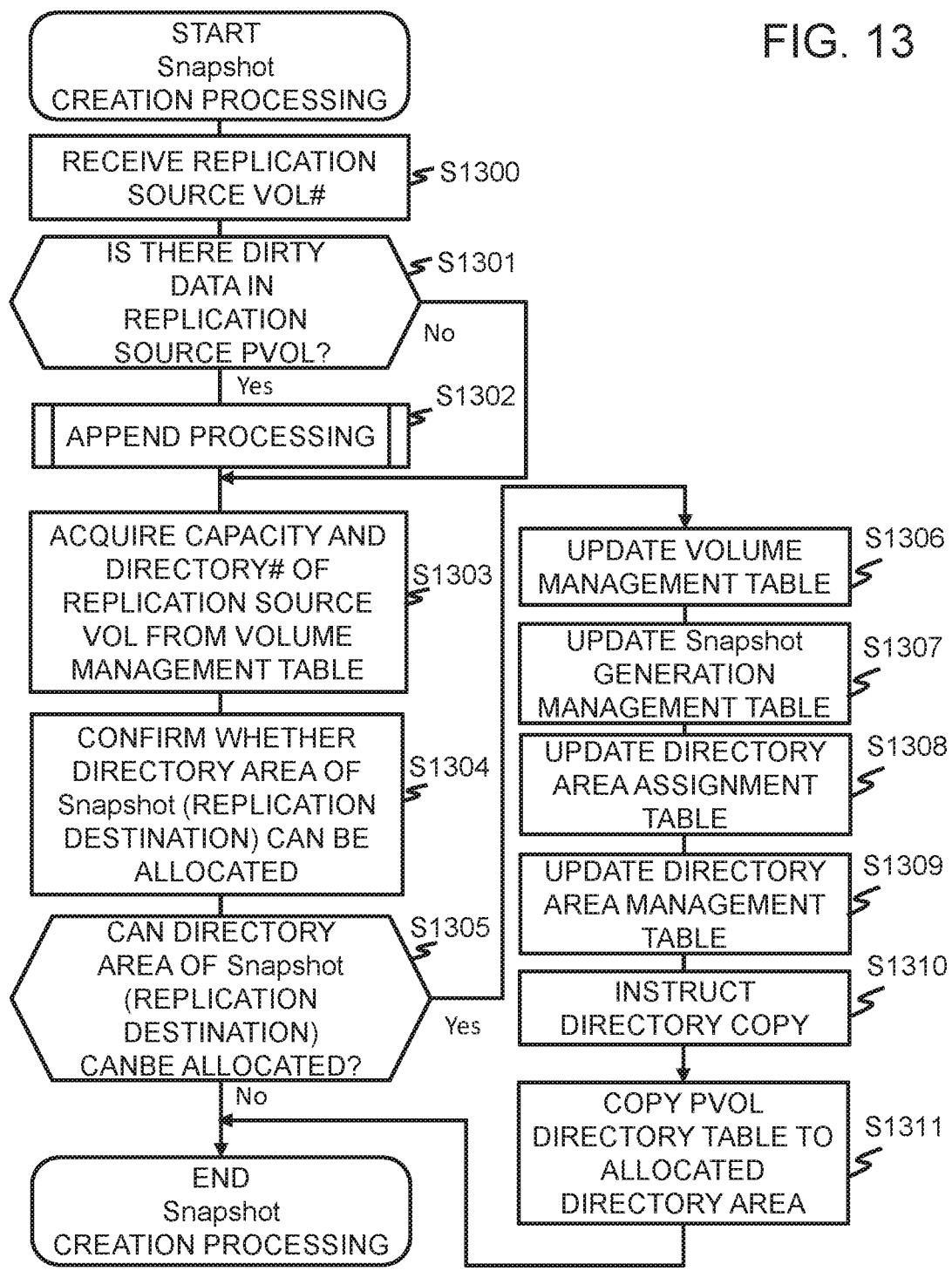
FIG. 13 is a flowchart showing the processing routine of the Snapshot creation processing.

FIG. 13 is a flowchart showing the processing routine of the Snapshot creation processing. The Snapshot creation processing is executed by the Snapshot creation program 304 according to an instruction from the management system 203.

Foremost, in S1300, the Snapshot creation program 304 receives the VOL # of the replication source VOL, which is the PVOL to undergo the Snapshot creation. Next, in S1301, the Snapshot creation program 304 determines whether the cache memory 301 includes dirty data which has not been destaged to the replication source VOL received in S1300. The Snapshot creation program 304 proceeds to the processing of S1302 when there is dirty data which has not been destaged to the replication source VOL (S1301: Yes), and proceeds to the processing of S1303 when there is no such dirty data (S1301: No). In S1302, the Snapshot creation program 304 performs the append processing of dirty data, but the details thereof will be explained later with reference to FIG. 14.

In S1303, the Snapshot creation program 304 acquires the capacity and the directory # of the replication source VOL from the volume management table 311. Next, in S1304, the Snapshot creation program 304 confirms whether the directory area of the Snapshot (replication destination), which is a replication of the replication source VOL, can be allocated in the DSVOL 102. The Snapshot creation program 304 proceeds to the processing of S1306 when the directory area of the Snapshot (replication destination) can be allocated (S1305: Yes), and ends the Snapshot creation processing when the directory area of the Snapshot (replication destination) cannot be allocated (S1305: No).

In S1306, the Snapshot creation program 304 appends, to the volume management table 311, the volume information including the attributes created in the Snapshot creation processing; that is, the Snapshot directory #, mapping #, capacity, and Pool #, and updates the volume management table 311. The value of the mapping #603 of the Snapshot is a copy of the value of the mapping # of the replication source PVOL.

Next, in S1307, the Snapshot creation program 304 increments (+1) the latest generation #1101 of the created Snapshot, and updates the Snapshot generation management table 316 by setting the Snapshot creation time 1103, the Snapshot #1104 (corresponds to the VOL # of the volume management table 311), and the status 1105=SUSPEND.

Next, in S1308, the Snapshot creation program 304 updates the directory area assignment table 314 by appending the offset address and the assigned directory # of the directory area assigned to the Snapshot, which was determined to be assignable in S1305.

Next, in S1309, the Snapshot creation program 304 updates the directory area management table 312 with the value of the directory area offset address 900 of the directory area assignment table 314 updated in S1308 as the value of the directory area offset address 701, and the value of the assigned directory #901 as the value of the directory #700.

Next, in S1310, the Snapshot creation program 304 instructs each storage controller 210 of a plurality of DSVOLs 102-*i* to copy the directory. Next, in 1311, upon receiving the instruction for copying the directory of S1310, the Snapshot creation program 304 controls each storage controller 210 of a plurality of DSVOLs 102-*i*, and copies the directory table 103-*i* of the PVOL, which is a replication source VOL, to the directory area of each DSVOL 102-*i* allocated in S1308 and S1309 based on parallel processing. A new directory # is assigned to the directory table 104-*i* created based on the copy.

Figure 14:
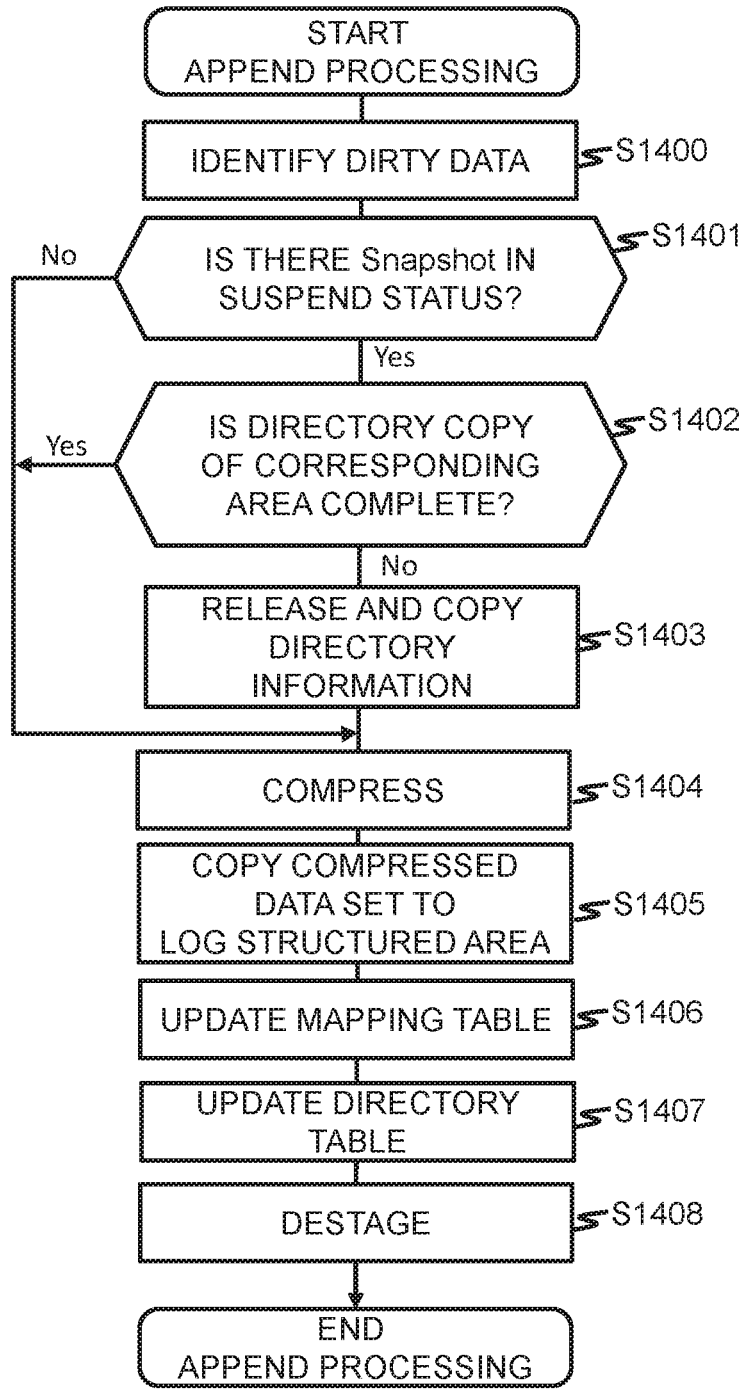
FIG. 14 is a flowchart showing the processing routine of the append processing.

FIG. 14 is a flowchart showing the processing routine of the append processing. FIG. 14 shows the details of the append processing executed respectively in S1302 of FIG. 13, S1604 of FIG. 16, S1701 of FIG. 17, S1802 of FIG. 18, S1902 of FIG. 19, S2102 of FIG. 23, and S2202 of FIG. 24. In the following explanation, as the append processing executed in S1302 of FIG. 13, the Snapshot creation program 304 is explained as the processing subject.

Figure 16:
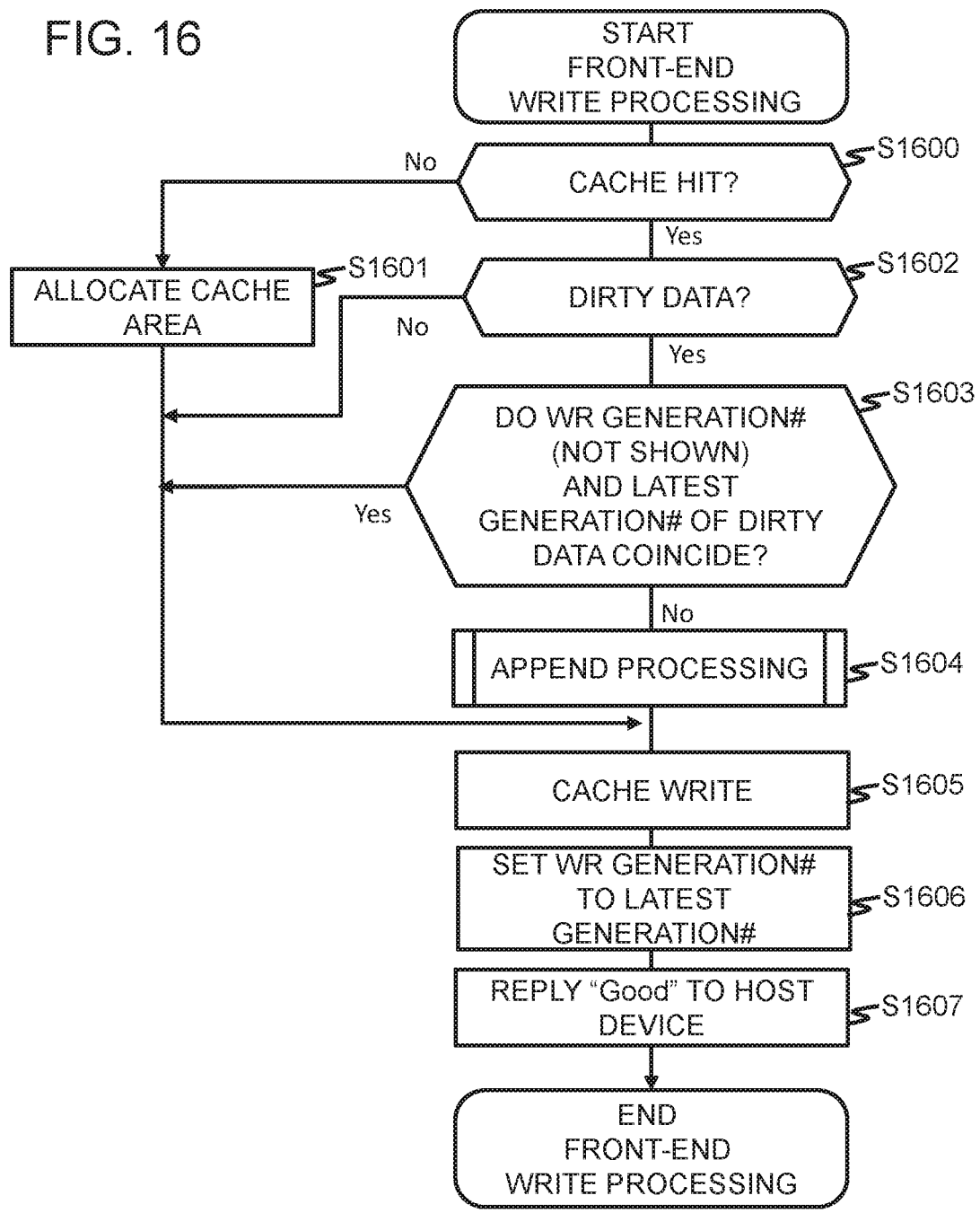
FIG. 16 is a flowchart showing the processing routine of the front-end write processing (common for PVOL/Snapshot).
Figure 17:
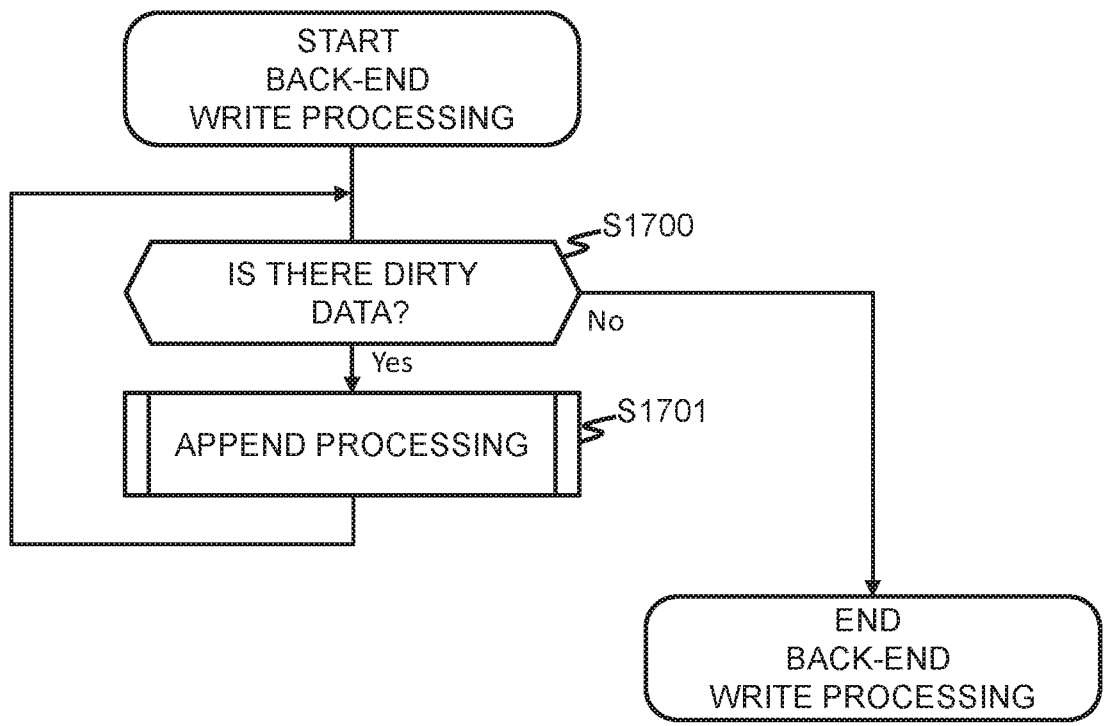
FIG. 17 is a flowchart showing the processing routine of the back-end write processing.
Figure 18:
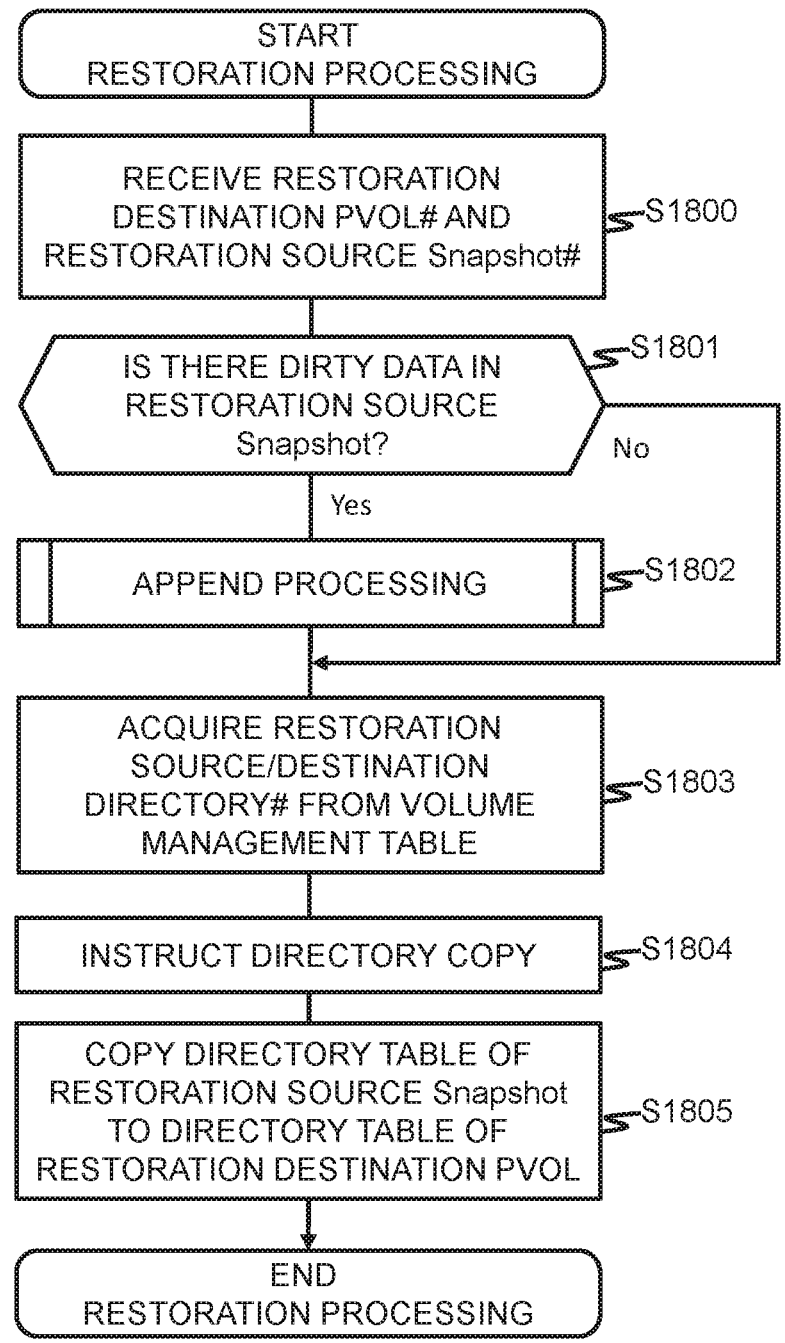
FIG. 18 is a flowchart showing the processing routine of the restoration processing of the first embodiment.
Figure 19:
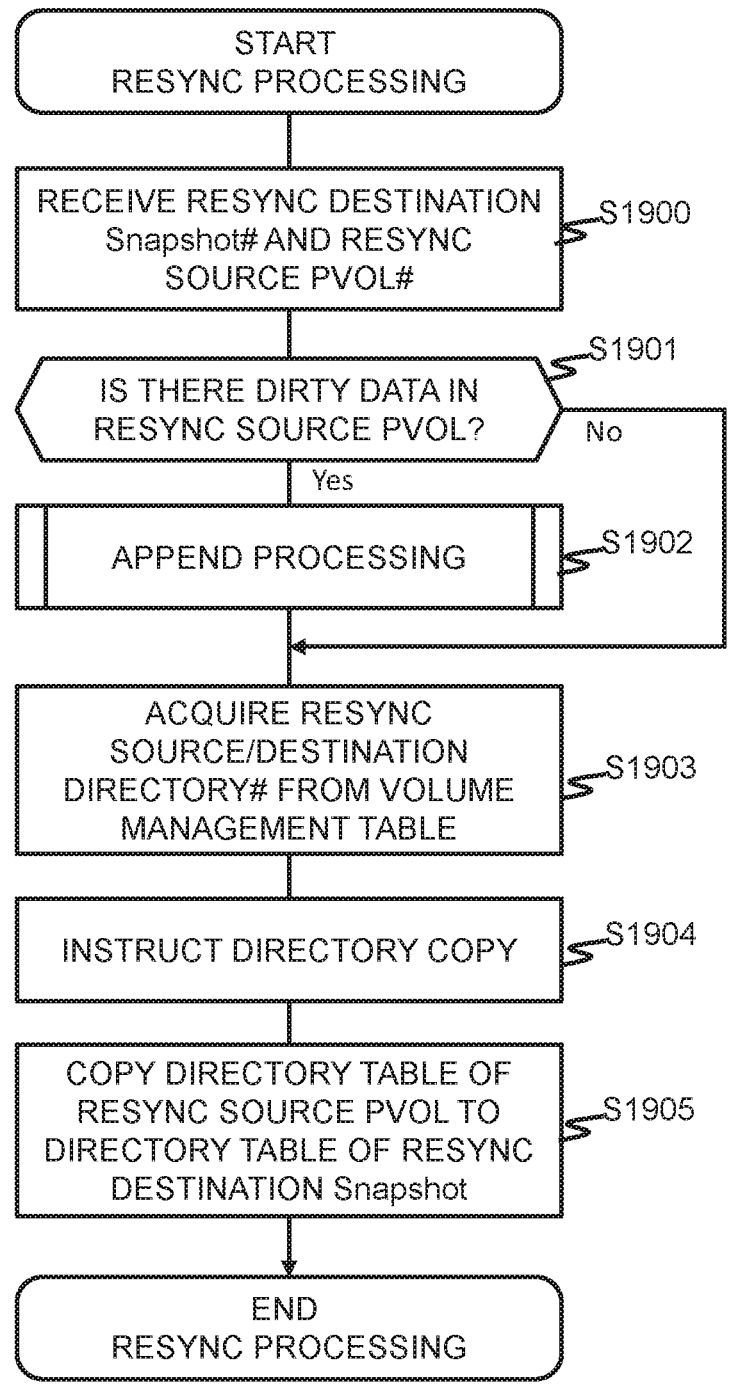
FIG. 19 is a flowchart showing the processing routine of the resync processing of the first embodiment.
Figure 23:
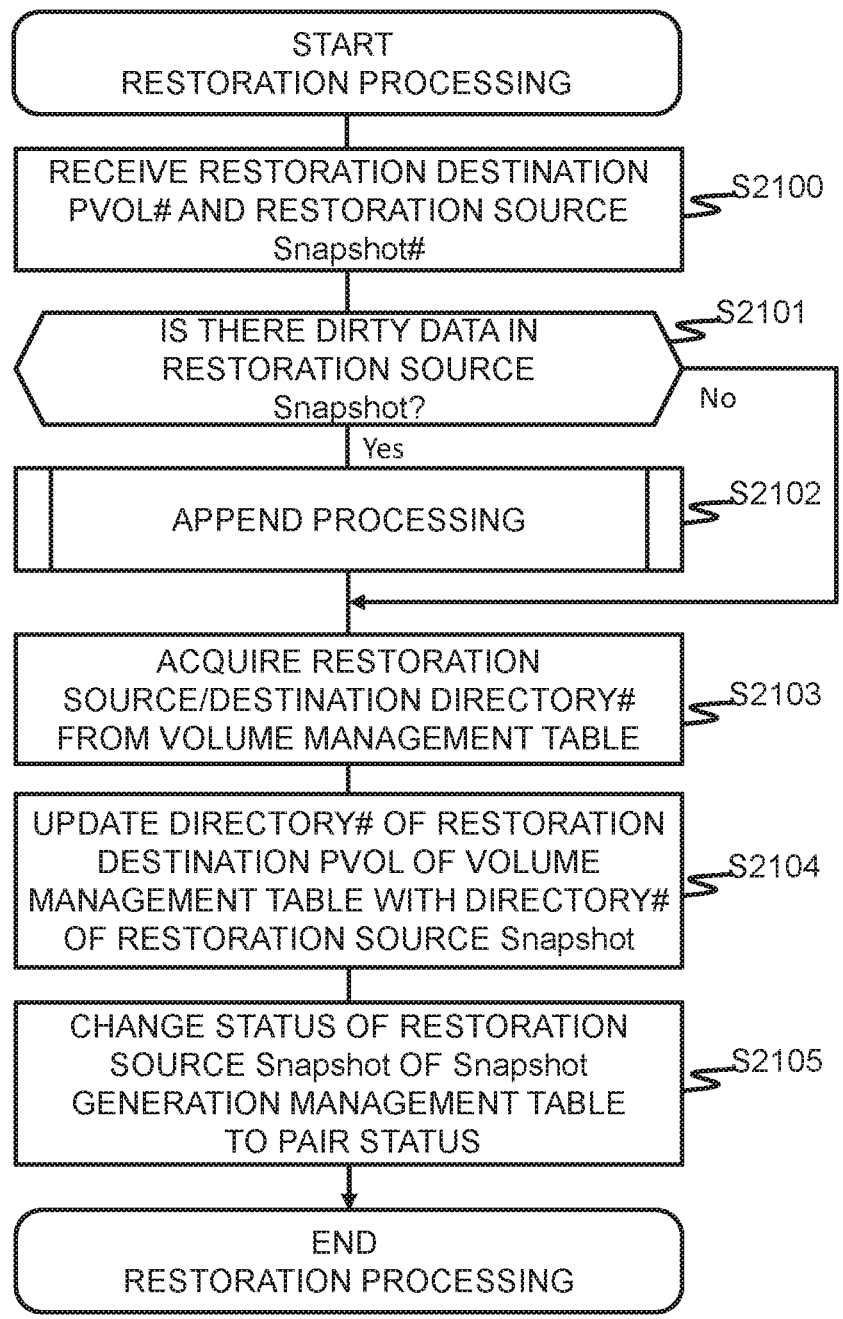
FIG. 23 is a flowchart showing the processing routine of the restoration processing of the second embodiment.

Note that the front-end write program 306 is the processing subject in S1604 of FIG. 16, the back-end write program 307 is the processing subject in S1701 of FIG. 17, the restoration program 308 is the processing subject in S1802 of FIG. 18, the resync program 309 is the processing subject in S1902 of FIG. 19, the restoration program 308 is the processing subject in S2102 of FIG. 23, and the resync program 309 is the processing subject in S2202 of FIG. 24, respectively.

Foremost, in S1400, the Snapshot creation program 304 identifies dirty data. Next, in S1401, the Snapshot creation program 304 refers to the Snapshot generation management table 316, and determines whether the PVOL includes a Snapshot in a SUSPEND status. The Snapshot creation program 304 proceeds to the processing of S1404 when there is no Snapshot in a SUSPEND status (S1401: No), and proceeds to the processing of S1402 when there is a Snapshot in a SUSPEND status (S1401: Yes).

In S1402, the Snapshot creation program 304 determines whether the copy of the directory corresponding to the logical address (LBA) of the dirty data to undergo the append processing has been completed. The Snapshot creation program 304 proceeds to the processing of S1404 when the copy of the directory has been completed (S1402: Yes), and releases and copies the directory information of the corresponding area when the copy of the directory has not been completed (S1402: No). The act of "releasing and copying" is the processing of specifically copying only the directory information of the area to undergo the append processing upon appending the uncopied area in the copy processing in S1311 of FIG. 13.

Next, in S1404, the Snapshot creation program 304 compresses the dirty data identified in S1400. Next, in S1405, the Snapshot creation program 304 copies the compressed data set, which was compressed in S1404, to the log structured area of the replication source VOL.

Next, in S1406, the Snapshot creation program 304 retains the storage location in the log structured area of the data compressed in S1404 in an unused entry, which has not been set in the reference destination address (log structured area internal address) 501, among the respective entries of the mapping table 105. In other words, the Snapshot creation program 304 sets the copy destination address of the compressed data as the reference destination address (log structured area internal address) 501.

Next, in S1407, the Snapshot creation program 304 sets the mapping area internal address 500 of the mapping information created in S1406 as the reference destination address (mapping area internal address) 401 in the entry corresponding to the logical address (LBA that is accessible from the host) of the data among the respective entries of the directory table 103.

Next, in S1408, the Snapshot creation program 304 destages the copied dirty data to the log structured area in S1405.

Figure 15:
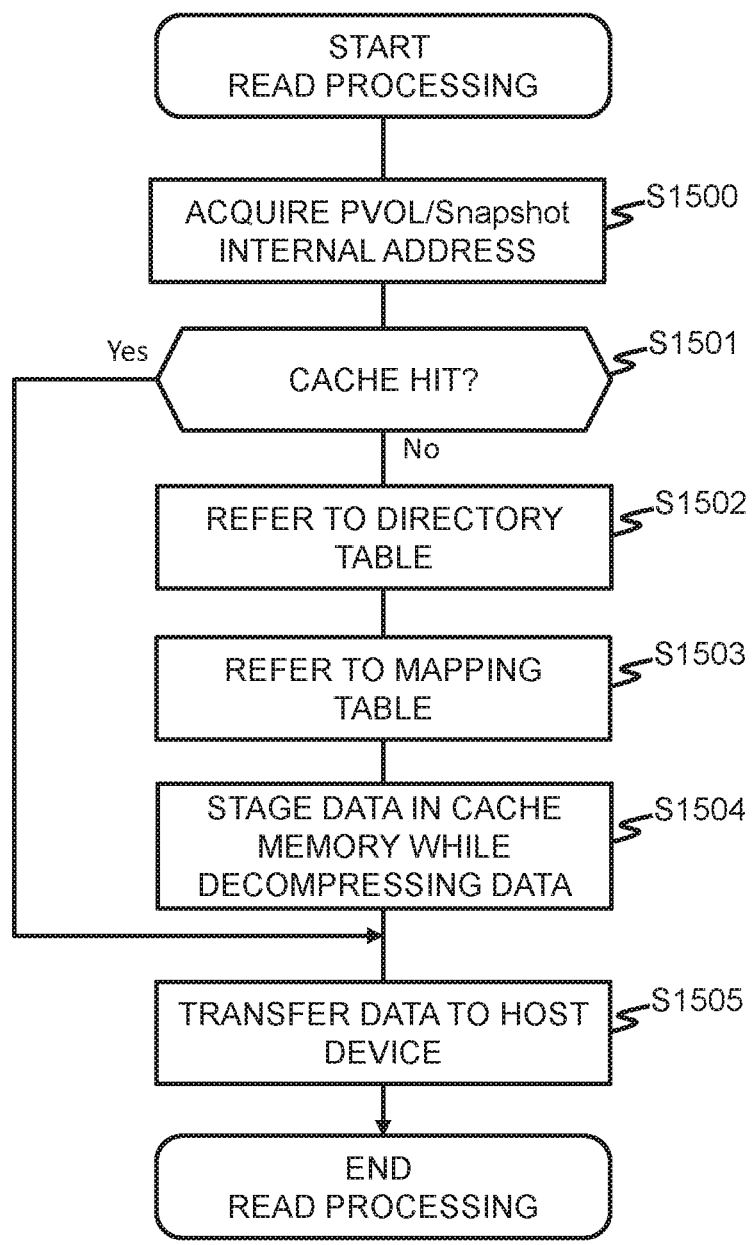
FIG. 15 is a flowchart showing the processing routine of the read processing.

FIG. 15 is a flowchart showing the processing routine of the read processing. The read processing is executed by the read program 305 according to a read request from the host device.

Foremost, in S1500, the read program 305 acquires the internal address of the PVOL or the Snapshot of the target data of the read request from the server system 202. Next, in S1501, the read program 305 determines whether the target data of the read request is a cache hit. The read program 305 proceeds to the processing of S1505 when the target data of the read request is a cache hit (S1501: Yes), and proceeds to the processing of S1502 when the target data of the read request is not a cache hit (S1501: No).

In S1502, the read program 305 refers to the directory table 103, 104, and acquires the reference destination address (mapping area internal address) 401 based on the PVOL/Snapshot internal address acquired in S1500. The read program 305 refers to the PVOL directory table 103 when the target data of the read request is the data in the PVOL 100, and refers to the Snapshot directory table 104 when the target data of the read request is the data in the Snapshot 101.

Next, in S1503, the read program 305 refers to the mapping table 105, and acquires the reference destination address (log structured area internal address) 501 based on the reference destination address (mapping area internal address) acquired in S1502. Next, in S1504, the read program 305 stages the data stored in the log structured area internal address identified in S1503 while decompressing the data.

Next, in S1505, the read program 305 transfers, to the host device, the data that was a cache hit in S1501 or the data destaged in S1504.

FIG. 16 is a flowchart showing the processing routine of the front-end write processing (common for PVOL/Snapshot). The front-end write processing is executed by the front-end write program 306 upon receiving, from the host device, a write request for writing data in the PVOL 100 or the Snapshot 101.

Foremost, in S1600, the front-end write program 306 determines whether the target data of the write request from the host device is a cache hit. The front-end write program 306 proceeds to the processing of S1602 when the target data of the write request is a cache hit (S1600: Yes), and proceeds to the processing of S1601 when the target data of the write request is not a cache hit (S1600: No). In S1601, the front-end write program 306 allocates a cache area in the cache memory 301.

In S1602, the front-end write program 306 determines whether the target data, which was a cache hit in S1600, is dirty data. The front-end write program 306 proceeds to the processing of S1603 when the target data that was a cache hit in S1600 is dirty data (S1602: Yes), and proceeds to the processing of S1605 when the target data that was a cache hit in S1600 is not dirty data (S1602: No).

In S1603, the front-end write program 306 determines whether the WR (WRight) generation # of the dirty data determined in S1602 and the generation # of the target data of the write request coincide. The WR generation # is retained in the management information (not shown) of the cache data. Moreover, the generation # of the target data of the write request is acquired from the latest generation #1101 of FIG. 11. S1603 is a process for preventing the dirty data from being updated with the target data of the write request and the snapshot data from being overwritten before the append processing of the target data (dirty data) of the immediately acquired snapshot is performed. The front-end write program 306 proceeds to the processing of S1605 when the WR generation # and the latest generation # coincide (S1603: Yes), and proceeds to the processing of S1604 when the WR generation # and the latest generation # do not coincide (S1603: No).

In S1604, the front-end write program 306 executes the append processing explained with reference to FIG. 14. Based on S1604, the dirty data of the WR generation # that does not coincide with the latest generation # is written in the log structured area, and destaged from the cache memory 301.

In S1605, the front-end write program 306 writes the target data of the write request in the cache area allocated in S1601, or in the cache area in which dirty data can be generated once again by performing the append processing to the dirty data which needs to undergo the append processing.

In S1606, the front-end write program 306 sets the WR generation # of the cache data written in the cache memory 301 in S1605 as the latest generation # compared in S1603. In S1607, the front-end write program 306 returns a normal reply (Good reply) to the host device.

FIG. 17 is a flowchart showing the processing routine of the back-end write processing. The back-end write processing is the processing of writing non-reflected data in the log structured area 106 when data (dirty data), which has not yet been reflected in the log structured area 106 of the DSVOL 102, exists in the cache memory 301. The back-end write processing is performed synchronously or asynchronously with the front-end processing. The back-end write processing is executed by the back-end write program 307.

Foremost, in S1700, the back-end write program 307 determines whether there is dirty data in the cache memory 301. The back-end write program 307 proceeds to the processing of S1701 when there is dirty data in the cache memory 301 (S1700: Yes), and ends the back-end write processing when there is no dirty data in the cache memory 301 (S1700: No). In S1701, the back-end write program 307 executes the append processing explained with reference to FIG. 14.

FIG. 18 is a flowchart showing the processing routine of the restoration processing of the first embodiment. The restoration processing is executed by the restoration program 308 according to an instruction of restoration (data restoration) from the management system 203.

Foremost, in S1800, the restoration program 308 receives the PVOL # of the restoration destination and the Snapshot # of the restoration source from the management system 203. Next, in S1801, the restoration program 308 determines whether there is dirty data in the restoration source Snapshot that received the Snapshot # in S1800. The restoration program 308 proceeds to the processing of S1802 when there is dirty data in the restoration source Snapshot (S1801: Yes), and proceeds to the processing of S1803 when there is no dirty data in the restoration source Snapshot (S1801: No).

In S1802, the restoration program 308 executes the append processing explained with reference to FIG. 14.

In S1803, the restoration program 308 acquires the directory # of the restoration source Snapshot and the directory # of the restoration destination PVOL from the volume management table 311. Next, in S1804, the restoration program 308 instructs each storage controller 210 of a plurality of DSVOLs 102-*i* to copy the directory of the restoration source/destination acquired in S1803.

Next, in S1805, the restoration program 308 copies the directory table 104-*i* having the directory # of the Snapshot of the restoration source acquired in S1803 to the directory table 103-*i* having the directory # of the PVOL of the restoration destination based on the parallel processing of each storage controller 210, respectively.

FIG. 19 is a flowchart showing the processing routine of the resync processing of the first embodiment. The resync processing is executed by the resync program 309 according to the instruction of resync (data resync) from the management system 203.

Foremost, in S1900, the resync program 309 receives the resync destination Snapshot # and the resync source PVOL # from the management system 203. Next, in S1901, the resync program 309 determines whether there is dirty data in the resync source PVOL. The resync program 309 proceeds to the processing of S1902 when there is dirty data in the resync source PVOL (S1901: Yes), and proceeds to the processing of S1903 when there is no dirty data in the resync source PVOL (S1901: No).

In S1902, the resync program 309 executes the append processing explained with reference to FIG. 14.

In S1903, the resync program 309 acquires the directory # of the resync source PVOL and the directory # of the resync destination Snapshot from the volume management table 311. Next, in S1904, the resync program 309 instructs each storage controller 210 of a plurality of DSVOLs 102-*i* to copy the directory acquired in S1903.

Next, in S1905, the resync program 309 copies the directory table 103-*i* having the directory # of the PVOL of the resync source acquired in S1903 to the directory table 104-*i* having the directory # of the Snapshot of the resync destination based on the parallel processing of each storage controller 210, respectively.

Figure 20:
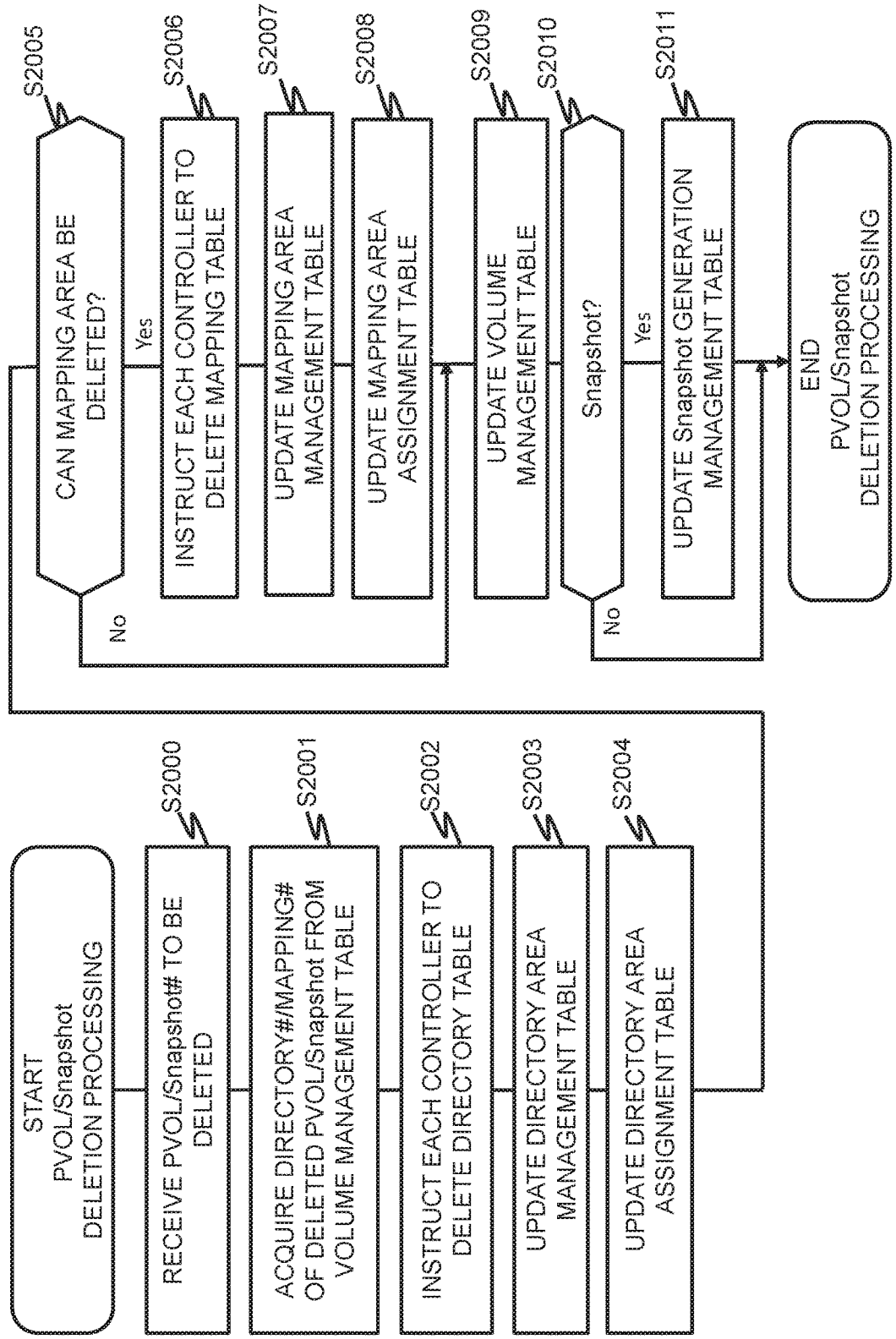
FIG. 20 is a flowchart showing the processing routine of the PVOL/Snapshot deletion processing.

FIG. 20 is a flowchart showing the processing routine of the PVOL/Snapshot deletion processing. The PVOL/Snapshot deletion processing is executed by the PVOL/Snapshot deletion program 310 according to an instruction from the management system 203 of deleting the volume or deleting the Snapshot.

Foremost, in S2000, the PVOL/Snapshot deletion program 310 receives the PVOL # or the Snapshot # to be deleted. Next, in S2001, the PVOL/Snapshot deletion program 310 acquires the directory # and the mapping # of the PVOL or the Snapshot to be deleted from the volume management table 311.

Next, in S2002, the PVOL/Snapshot deletion program 310 instructs each storage controller 210 controlling each DSVOL 102, in which each directory table has been distributed and arranged therein, to delete the directory table of the PVOL or the Snapshot to be deleted.

Next, in S2003, the PVOL/Snapshot deletion program 310 deletes, from the directory area management table 312, the record corresponding to the directory table deleted in S2002. Next, in S2004, the PVOL/Snapshot deletion program 310 deletes, from the directory area assignment table 314, the record of the directory area offset address 900 corresponding to the record that was deleted from the directory area management table 312 in S2003.

Next, in S2005, the PVOL/Snapshot deletion program 310 determines whether the mapping area can be deleted (that is, whether the target to be deleted it a PVOL without a Snapshot, or a single PVOL with a Snapshot). The PVOL/Snapshot deletion program 310 proceeds to the processing of S2006 when the mapping area can be deleted (S2005: Yes), and proceeds to the processing of S2009 when the mapping area cannot be deleted (S2005: No).

In S2006, the PVOL/Snapshot deletion program 310 instructs each storage controller 210 controlling each DSVOL 102, in which each mapping table has been distributed and arranged therein, to delete the mapping table of the PVOL to be deleted.

Next, in S2007, the PVOL/Snapshot deletion program 310 deletes, from the mapping area management table 313, the record corresponding to the deleted mapping table. Next, in S2008, the PVOL/Snapshot deletion program 310 deletes, from the mapping area assignment table 315, the record of the mapping area offset address 1000 corresponding to the record that was deleted from the mapping area management table 313 in S2007.

Next, in S2009, the PVOL/Snapshot deletion program 310 deletes, from the volume management table 311, the record of the volume corresponding to the deleted PVOL or Snapshot.

Next, in S2010, the PVOL/Snapshot deletion program 310 determines whether the deleted volume is a Snapshot. The PVOL/Snapshot deletion program 310 proceeds to the processing of S2011 when the deleted volume is a Snapshot (S2010: Yes), and ends the PVOL/Snapshot deletion processing when the deleted volume is a PVOL (S2010: No).

In S2011, the PVOL/Snapshot deletion program 310 deletes, from the Snapshot generation management table 316, the record of the deleted Snapshot. Here, when the deleted Snapshot is the latest generation in the Snapshot generation management table 316, the Snapshot of the newest generation subsequent to the Snapshot, from which the latest generation has been deleted, is set to be the latest generation.

The effect of the first embodiment is now explained with reference to FIG. 21 and FIG. 22.

Figure 21:
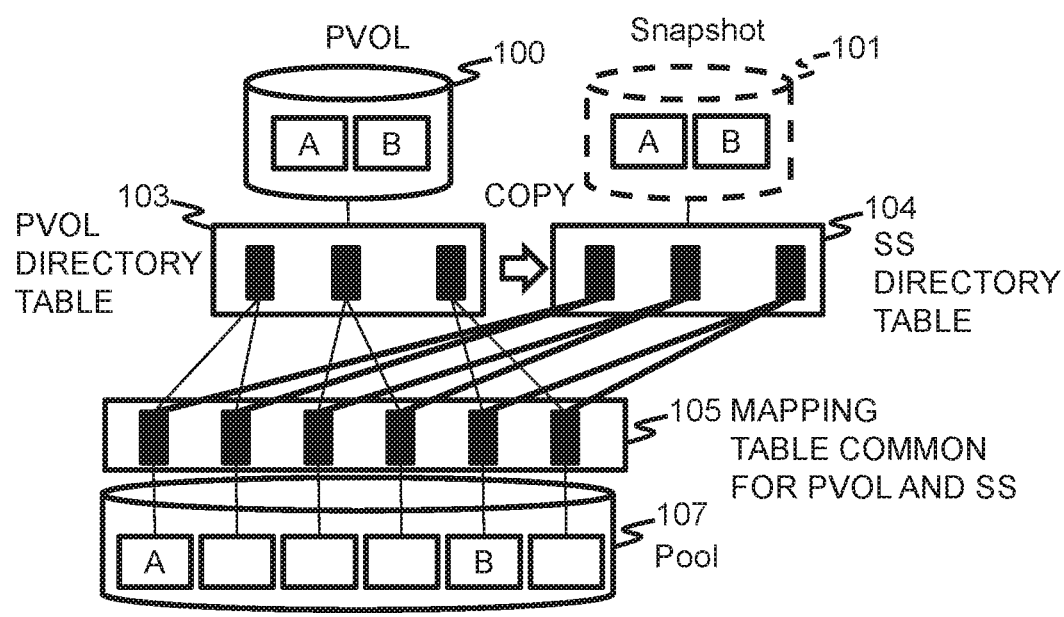
FIG. 21 is a diagram (part 1) explaining the effect of the first embodiment.

In this embodiment, as shown in FIG. 21, the meta information tree is of a two-stage configuration including the PVOL directory table 103 as the meta information of the first tier, and the mapping table 105 (common for PVOL and Snapshot) as the meta information of the second tier. The PVOL directory table 103 is a table for managing the pointer to the meta information that refers to the data.

When the Snapshot is acquired, only the PVOL directory table 103 of the first stage is copied, and the Snapshot directory table 104 is created. The reading and writing of data from and in the PVOL 100 are performed by accessing the data based on the directory table 103 and the mapping table 105. Moreover, the reading and writing of data from and in the Snapshot 101 are performed by accessing the data based on the directory table 104 and the mapping table 105. It is thereby possible to reduce the overhead of conducting a search during data access.

Figure 22:
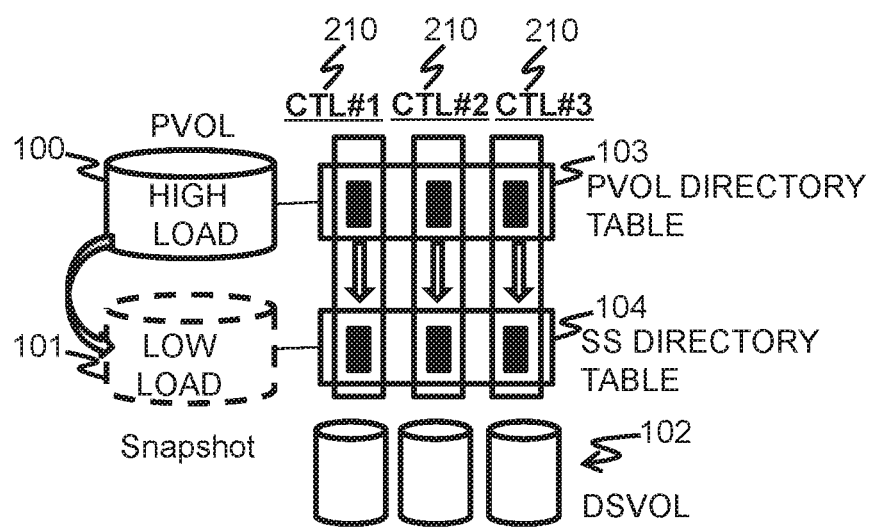
FIG. 22 is a diagram (part 2) explaining the effect of the first embodiment.

Moreover, in this embodiment, as shown in FIG. 22, the PVOL directory table 103 is distributed and arranged, in a fine granularity, to a plurality of DSVOLs 102 controlled by each storage controller 210. Subsequently, when the Snapshot is acquired, the plurality of storage controllers 210 copy tables in units of the PVOL directory table 103, which is distributed and arranged in the respective DSVOLs 102. The time required for the Snapshot creation can be shortened since the tables are copied based on the parallel processing described above. Furthermore, even if the I/O load is concentrated on a specific PVOL/Snapshot and becomes a high load, since the load will be distributed to a plurality of storage controllers 210, a plurality of storage controller resources can be effectively utilized.

Thus, according to this embodiment, it is possible to balance the I/O performance and the storage system operational performance without impairing the performance of the functions required by a storage system. Moreover, even when the I/O load is concentrated, advantages of a multi controller can be sufficiently enjoyed without being limited by the performance of one storage controller. Moreover, a replication of the volume can be created on-demand without having to worry about the performance degradation or the capacity of the storage system.

Second Embodiment

In comparison to the first embodiment, the restoration processing and the resync processing are different in the second embodiment. In the restoration processing of the second embodiment, the volume management table (FIG. 6) is updated so that the directory # of the restoration destination and the directory # of the restoration source become common without copying the directory table, and the same directory area is referenced by the restoration source/destination.

Moreover, in the resync processing of the second embodiment, the volume management table (FIG. 6) is updated so that the directory # of the resync destination and the directory # of the resync source become common without copying the directory table, and the same directory area is referenced by the restoration source/destination.

FIG. 23 is a flowchart showing the processing routine of the restoration processing of the second embodiment. S2100, S2101, S2102, and S2103 in FIG. 23 are respectively the same as S1800, S1801, S1802, and S1803 in FIG. 18.

In S2104 subsequent to S2103, the restoration program 308 updates the directory # of the restoration destination PVOL with the directory # of the restoration source Snapshot in the volume management table 311. In the example of FIG. 6, the directory #602 of the attribute=PVOL of the VOL #=0 of the restoration destination is updated with the directory # (1, 5, 20) of the attribute=Snapshot of the VOL #=1 of the restoration source. Next, in S2105, the restoration program 308 changes the status 1105 of the restoration source Snapshot of the Snapshot generation management table 316 to PAIR.

FIG. 24 is a flowchart showing the processing routine of the resync processing of the second embodiment. S2200, S2201, S2202, and S2203 in FIG. 24 are respectively the same as S1900, S1901, S1902, and S1903 in FIG. 19.

In S2204 subsequent to S2203, the resync program 309 updates the directory # of the resync destination Snapshot with the directory # of the resync source PVOL in the volume management table 311. In the example of FIG. 6, the directory #602 of the attribute=Snapshot of the VOL #=1 of the resync destination is updated with the directory # (0, 10, 200) of the attribute=PVOL of the VOL #=0 of the resync source. Next, in S2205, the resync program 309 changes the status 1105 of the resync destination Snapshot of the Snapshot generation management table 316 to PAIR.

As described above, the second embodiment is advantageous in that the processing amount is small since only the reference destination is changed, without copying the directory table, in comparison to the restoration processing and the resync processing of the first embodiment.

Note that the present invention is not limited to the embodiments described above, and includes various modified examples. For example, the foregoing embodiments were explained in detail for explaining the present invention in an easy-to-understand manner, and the present invention does not need to necessarily comprise all of the configurations explained in the foregoing embodiments. Moreover, without limitation to the deletion of the foregoing configuration, a configuration may also be substituted or added.

Moreover, a part or all of the respective configurations, functions, processing units, and processing means described above may be realized with hardware such as by designing an integrated circuit. Moreover, the present invention may also be realized with a program code of software which realizes the functions of the foregoing embodiments. In the foregoing case, a recording medium with the program code recorded thereon is provided to a computer, and a processor equipped in the computer reads the program code stored in the recording medium. In the foregoing case, the program code itself read from the recording medium will realize the functions of the foregoing embodiments, and the program code itself, and the recording medium with the program code recorded thereon, will configure the present invention. As the recording medium for supplying this kind of program code, used may be, for example, a flexible disk, a CD-ROM, a DVD-ROM, a hard disk, an SSD (Solid State Drive), an optical disk, a magneto-optical disk, a CD-R, a magnetic tape, a non-volatile memory card, or a ROM.

Moreover, the program code which realizes the functions described in this embodiment may be implemented, for example, based on a wide range of programs or script languages such as assembler, C/C++, perl, Shell, PHP, and Java (registered trademark).

Moreover, in the foregoing embodiments, control lines and information lines are illustrated to the extent required for the explanation, and not all control lines and information lines required for the product are not necessarily illustrated. All configurations may be mutually connected.

REFERENCE SIGNS LIST

100: computer system, 103, 103-i, 104, 104-i: directory table, 105, 105-i: mapping table, 106, 106-i: log structured area, 201: storage system, 202: server system, 203: management system, 210: storage controller

The invention claimed is:

1. A storage system including a plurality of controllers and capable of creating a snapshot, which is a replication of a logical volume, wherein:
the logical volume or the snapshot to be handled by a controller of the plurality of controllers is assigned to the controller; a log structured area which stores data of the logical volume or the snapshot, and a meta information area which stores meta information of the data appended to the log structured area, are assigned to the controller;
the controller comprises a data control unit which appends the data of the logical volume to the log structured area, and a data management unit which stores the meta information of the data appended to the log structured area by the data control unit in the meta information area;
the meta information is composed of meta information of a first tier and meta information of a second tier which correlate location information of the data in the logical volume and location information of the data in the log structured area, wherewith the meta information of the first tier is information which correlates the location information of the data in the logical volume and a storage location of the meta information of the second tier related to that data, and the meta information of the second tier is information which manages the location information of the data in the log structured area;
when creating a snapshot of the logical volume, the data management unit creates, in the same meta information area as a replication source, a replication of the meta information of the first tier stored in a plurality of meta information areas assigned to the plurality of controllers; and
the data control unit of the controller pertaining to the meta information area in which the replication of the meta information of the first tier was created accesses the data of the log structured area from the logical volume based on the meta information of the second tier referenced based on the meta information of the first tier, and accesses the data of the log structured area from the snapshot based on the meta information of the second tier referenced based on the replication of the meta information of the first tier.

2. The storage system according to claim 1, wherein:
the logical volume, or the log structured area and the logical volume storing the data of the snapshot, or the meta information area storing the meta information of the data of the snapshot, is assigned to a plurality of data storage volumes; and
the meta information of the first tier and the meta information of the second tier are respectively distributed and arranged in the plurality of data storage volumes.

3. The storage system according to claim 2, wherein:
the meta information of the first tier is distributed and arranged in the plurality of data storage volumes in units of granularity of logical data of the logical volume.

4. The storage system according to claim 1, wherein:
when restoring the logical volume from the snapshot, the data management unit updates the meta information of the first tier with the replication of the meta information of the first tier.

5. The storage system according to claim 1, wherein:
when resyncing the logical volume and the snapshot, the data management unit updates the replication of the meta information of the first tier with the meta information of the first tier.

6. The storage system according to claim 1, wherein:
when restoring the logical volume from the snapshot, the data management unit updates identification information of the meta information of the first tier associated with the logical volume with identification information of the meta information of the first tier associated with the snapshot in management information which manages the meta information of the first tier for each volume.

7. The storage system according to claim 1, wherein:
when resyncing the logical volume and the snapshot, the data management unit updates identification information of the meta information of the first tier associated with the snapshot with identification information of the meta information of the first tier associated with the logical volume in management information which manages the meta information of the first tier for each volume.

8. A data replication method in a storage system including a plurality of controllers and capable of creating a snapshot, which is a replication of a logical volume, wherein:

the logical volume or the snapshot to be handled by a controller of the plurality of controllers is assigned to the controller;

a log structured area which stores data of the logical volume or the snapshot, and a meta information area which stores meta information of the data appended to the log structured area, are assigned to the controller;

the controller comprises a data control unit which appends the data of the logical volume to the log structured area, and a data management unit which stores the meta information of the data appended to the log structured area by the data control unit in the meta information area; the meta information is composed of meta information of a first tier and meta information of a second tier which correlate location information of the data in the logical volume and location information of the data in the log structured area, wherewith the meta information of the first tier is information which correlates the location information of the data in the logical volume and a storage location of the meta information of the second tier related to that data, and the meta information of the second tier is information which manages the location information of the data in the log structured area;

when creating a snapshot of the logical volume, the data management unit creates, in the same meta information area as a replication source, a replication of the meta information of the first tier stored in a plurality of meta information areas assigned to the plurality of controllers; and the data control unit of the controller pertaining to the meta information area in which the replication of the meta information of the first tier was created accesses the data of the log structured area from the logical volume based on the meta information of the second tier referenced based on the meta information of the first tier, and accesses the data of the log structured area from the snapshot based on the meta information of the second tier referenced based on the replication of the meta information of the first tier.

* * * * *